United States Patent
Lin et al.

(10) Patent No.: US 9,200,806 B2
(45) Date of Patent: Dec. 1, 2015

(54) COAL FLOW DISTRIBUTION CONTROLLERS FOR COAL PULVERIZERS

(71) Applicant: Babcock Power Services, Inc., Worcester, MA (US)

(72) Inventors: Qingsheng Lin, Holden, MA (US); Joseph Bianca, South Hampton, MA (US); Jilin Zhang, Worcester, MA (US); William Freeman, Townsend, MA (US); John W. Rath, III, Greenwich, NY (US)

(73) Assignee: Babcock Power Services, Inc., Worcester, MA (US)

( * ) Notice: Subject to any disclaimer, the term of this patent is extended or adjusted under 35 U.S.C. 154(b) by 0 days.

(21) Appl. No.: 14/538,204

(22) Filed: Nov. 11, 2014

(65) Prior Publication Data

US 2015/0059140 A1 Mar. 5, 2015

Related U.S. Application Data

(62) Division of application No. 13/428,113, filed on Mar. 23, 2012, now Pat. No. 8,915,373.

(60) Provisional application No. 61/467,239, filed on Mar. 24, 2011.

(51) Int. Cl.
*F23K 3/02* (2006.01)
*B23P 17/04* (2006.01)
*F27D 3/00* (2006.01)
(Continued)

(52) U.S. Cl.
CPC . *F23K 3/02* (2013.01); *B23P 17/04* (2013.01); *B65G 53/528* (2013.01); *F27D 3/00* (2013.01); *F27D 3/18* (2013.01); *F27D 5/00* (2013.01); *F23K 2201/1006* (2013.01); *F23K 2203/105* (2013.01); *F23K 2203/201* (2013.01); *Y10T 29/49716* (2015.01)

(58) Field of Classification Search
CPC ............ B07B 7/04; B07B 7/10; B07B 11/04; B07B 11/06; F23K 3/02; F23K 2201/1006; F23K 2201/30; F23K 2203/20; F23K 2203/105; F23K 2203/201; B02C 23/10; B02C 23/30; B02C 2015/002; B65G 53/528
See application file for complete search history.

(56) References Cited

U.S. PATENT DOCUMENTS 2,868,462 A   1/1959  Bogot et al.
2,975,001 A *  3/1961  Davis ........................... 406/155
(Continued)

OTHER PUBLICATIONS

International Search Report and Written Opinion for PCT/US2012/030268, dated Dec. 20, 2012.

*Primary Examiner* — Joseph C Rodriguez
(74) *Attorney, Agent, or Firm* — Locke Lord LLP; Joshua L. Jones; Alicia J. Carroll

(57) ABSTRACT

A solid particle flow distribution controller includes an extension skirt configured to be mounted to a discharge skirt at a division between an upstream solid particle conveyance pipe and a plurality of downstream pipes. The extension skirt includes a plurality of circumferential segments. Each segment is movably mounted to the discharge skirt for movement in an upstream and downstream direction with respect to the discharge skirt. The segments of the extension skirt are configured and adapted for motion in the upstream and downstream direction independent of one another to extend upstream of the discharge skirt as needed to improve solid particle distribution among the downstream pipes.

13 Claims, 3 Drawing Sheets

(51) Int. Cl.
*F27D 3/18* (2006.01)
*F27D 5/00* (2006.01)
*B65G 53/52* (2006.01)

(56) References Cited

U.S. PATENT DOCUMENTS

| | | | |
|---|---|---|---|
| 3,098,036 A | 7/1963 | Neumann | |
| 4,147,116 A * | 4/1979 | Graybill | 110/263 |
| 4,504,018 A | 3/1985 | Diggins | |
| 4,602,745 A | 7/1986 | Maliszewski et al. | |
| 4,689,141 A | 8/1987 | Folsberg | |
| 4,818,376 A | 4/1989 | Tanaka et al. | |
| 5,127,590 A | 7/1992 | Bunton | |
| 5,386,619 A | 2/1995 | Wark | |
| 5,549,251 A | 8/1996 | Provost | |
| 5,593,131 A | 1/1997 | Briggs, Jr. et al. | |
| 5,607,111 A | 3/1997 | Brundiek | |
| 5,624,039 A | 4/1997 | Folsberg | |
| 5,873,156 A * | 2/1999 | Wark | 29/401.1 |
| 5,908,167 A | 6/1999 | Provost | |
| 5,944,270 A | 8/1999 | Farris | |
| 6,024,311 A | 2/2000 | Prairie et al. | |
| 6,152,052 A | 11/2000 | Saxon et al. | |
| 6,231,273 B1 * | 5/2001 | Amieux | 406/173 |
| 6,257,415 B1 | 7/2001 | Wark | |
| 6,318,559 B2 | 11/2001 | Cordonnier et al. | |
| 6,494,151 B1 * | 12/2002 | Wark | 110/129 |
| 6,588,598 B2 * | 7/2003 | Wark | 209/143 |
| 6,607,079 B2 | 8/2003 | Laux | |
| 6,966,508 B2 | 11/2005 | Levy et al. | |
| 7,017,501 B2 | 3/2006 | Mann | |
| 7,549,382 B2 | 6/2009 | Levy et al. | |
| 7,891,593 B2 | 2/2011 | Gronholz | |
| 8,136,746 B2 | 3/2012 | Martin et al. | |
| 8,403,602 B2 | 3/2013 | Zarnescu | |
| 8,915,373 B2 * | 12/2014 | Lin et al. | 209/140 |
| 2004/0206279 A1 * | 10/2004 | Wark | 110/104 R |
| 2006/0124787 A1 | 6/2006 | Schweiger et al. | |
| 2013/0292304 A1 * | 11/2013 | Plant et al. | 209/139.1 |
| 2015/0056024 A1 * | 2/2015 | Rath et al. | 406/3 |

* cited by examiner

COAL FLOW DISTRIBUTION CONTROLLERS FOR COAL PULVERIZERS

CROSS-REFERENCE TO RELATED APPLICATIONS

This application is a divisional application of U.S. patent application Ser. No. 13/428,113 filed Mar. 23, 2012, which claims priority to U.S. Provisional Patent Application No. 61/467,239 filed Mar. 24, 2011, each of which is incorporated by reference herein in its entirety.

BACKGROUND OF THE INVENTION

1. Field of the Invention

The present invention relates to systems for conveying solid particles through gas flows, and more particularly to coal pulverizer (mill) discharge piping systems wherein coal particles are conveyed through air flows.

2. Description of Related Art

In coal combustion systems, coal and primary air (PA) flow distribution between burner lines is important for optimizing combustion and burner performance. Low $NO_x$ burner design usually requires that coal mass flow imbalance between coal pipes should be within +/−15% deviation from the mean value, or lower, to ensure burner performance. Imbalanced coal flow between coal pipes also negatively impacts combustion efficiency, as indicated by unburned carbon (UBC), heat rate, etc., as well as gaseous emissions such as $NO_x$, CO, etc. Orifices (fixed or variable) installed in the coal pipes for PA (primary air) flow adjustment are unable to correct the coal flow imbalance without having adverse effects on the PA flow distribution, when this imbalance is a result of uneven coal flow discharged from an upstream classifier.

To resolve the coal flow distribution shortcomings in the art, there exists a need in the art for a coal flow distribution system that provides a tool to correct particle flow distribution between coal pipes. There also remains a need in the art for such a system that has little or no negative impact on PA flow distribution between coal pipes. The present invention provides a solution for these problems.

SUMMARY OF THE INVENTION

The subject invention is directed to a new and useful solid particle flow distribution controller. The solid particle distribution controller includes an extension skirt configured to be mounted to a discharge skirt at a division between an upstream solid particle conveyance pipe and a plurality of downstream pipes. The extension skirt includes a plurality of circumferential segments. Each segment is movably mounted to the discharge skirt for movement in an upstream and downstream direction with respect to the discharge skirt. The segments of the extension skirt are configured and adapted for motion in the upstream and downstream direction independent of one another to extend upstream of the discharge skirt as needed to improve solid particle distribution among the downstream pipes.

In accordance with certain embodiments, the circumferential segments are mounted inside the discharge skirt so when moved into a downstream position the circumferential segments are radially inward of the discharge skirt. The circumferential segments can be mounted to the discharge skirt by way of tracks configured to guide movement of the circumferential segments. Each circumferential segment can be operatively connected to an actuator for moving the circumferential segment. Any suitable type of actuator or actuators can be used, such as manual actuators, electrical actuators, pneumatic actuators, or hydraulic actuators, for example.

In certain embodiments, the solid particle distribution controller is configured to be a coal flow distribution controller for a coal pulverizer system. A coal classifier is included having an inlet and a discharge skirt having a plurality of outlets. The discharge skirt has an interior optionally divided into a plurality of circumferentially segmented chambers by a set of partition plates mounted within the discharge skirt for dividing flow from the inlet to a plurality of outlet pipes downstream of the coal classifier. The distribution or extension skirt is mounted proximate an upstream portion of the discharge skirt, substantially concentric therewith. The segments of the extension skirt are configured and adapted for motion in the upstream and downstream direction independent of one another to extend upstream of the discharge skirt as needed to improve coal particle distribution between the chambers of the discharge skirt. A feed pipe can extend through the coal classifier along a centerline thereof. A center pipe can be mounted within the classifier for control of an adjustable return baffle for prevention of reverse air flow through the classifier or re-entrainment of coarse particles.

The invention also provides a method of controlling solid particle flow in each pipe of a solid particle piping system. The method includes adjusting one or more positions of the segments of a solid particle flow distribution controller as described above to change solid particle flow and mass flow distribution among a plurality of downstream pipes. The method can improve coal particle distribution with little or no negative effect on PA (primary air) flow.

In certain embodiments, the solid particle piping system is a coal piping system, wherein the downstream pipes are burner pipes operatively associated with a plurality of coal burners. It is also contemplated that the method can include moving one or more of the segments to a position to optimize air-to-coal ratios in individual burners, and/or to a position shifting fuel distribution to control steam temperature and/or boiler surface metal temperature in regions of a furnace. The method can also include moving the segments to a position shifting fuel distribution to decrease fuel flow to oxygen-starved regions of a furnace to reduce carbon monoxide emissions. Adjusting one or more positions of the segments can include controlling overall burner air-to-coal ratio for the burners, controlling flyash unburned carbon, and/or controlling loss on ignition. The positions of the segments can be adjusted with a coal classifier off line, or on line supplying coal to the burner pipes. Air flow distribution among the burner pipes can be controlled using external orifices in fluid communication with the burner pipes. Air or a gas other than air can be used to convey coal particles through the solid particle flow distribution controller.

The invention also provides a method of retrofitting a solid particle classifier. The method includes installing a plurality of circumferential skirt segments proximate a discharge skirt in a solid particle classifier. The skirt segments are configured as described above. Installing a plurality of circumferential skirt segments can include replacing a portion of the classifier. Replacing a portion of the classifier can include replacing a discharge turret of the classifier. Installing a plurality of circumferential skirt segments can include installing components in the classifier through one or more openings such as doors, slots, pipe openings, or the like.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
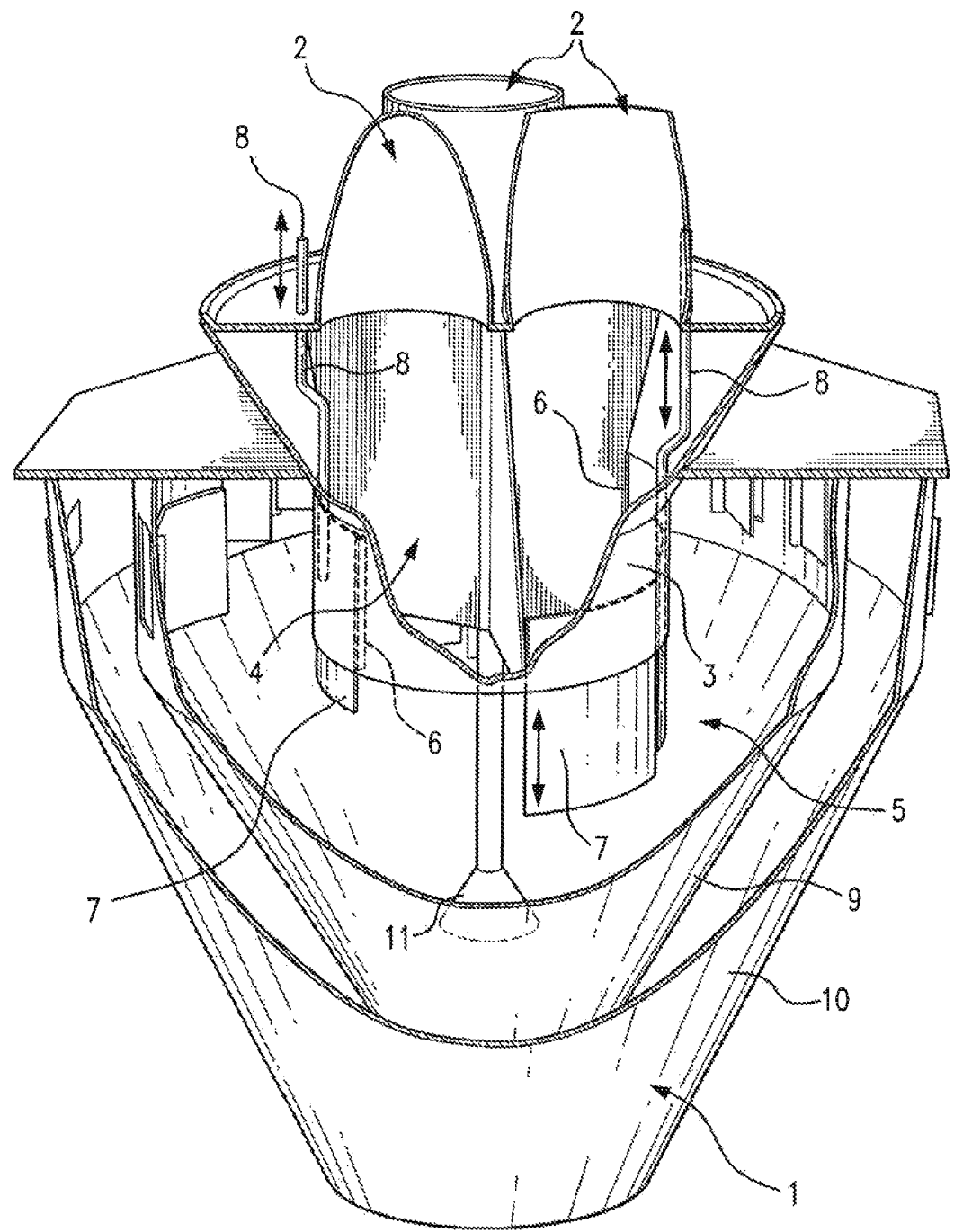
FIG. 1 is a cut away perspective view of an exemplary embodiment of a classifier constructed in accordance with the present invention, showing adjustable extension skirt segments extending in an upstream direction from the discharge skirt.

Reference will now be made to the drawings wherein like reference numerals identify similar structural features or aspects of the subject invention. For purposes of explanation and illustration, and not limitation, a partial view of an exemplary embodiment of a classifier in accordance with the invention is shown in FIG. 1 and is designated generally by reference character 1. Other embodiments of classifiers in accordance with the invention, or aspects thereof, are provided in FIGS. 2-3, as will be described. The systems and methods of the invention can be used, for example, on centrifugal type static classifiers to correct coal flow distribution with little or no negative impact on PA (primary air) flow distribution.

Classifier 1 provides for solid particle separation and flow correction in a solid particle conveyance system. Classifier 1 is shown by way of example as a coal particle classifier for classification of coal particles by removal of oversized particles and distribution of fine particles into multiple discharge pipes which in turn convey particles to burners in a multiple burner system. However, those skilled in the art will readily appreciate that any type of solid particle flow system can be used without departing from the spirit and scope of the invention. For example, the solid particle flow correction methods and devices described herein can readily be applied to non-coal substances such as limestone, cement, flyash, coke, and the like. Classifier 1 can be either static or dynamic, internal or external to the pulverizer, or can be a stand alone classifier.

For mill systems equipped with a classifier in accordance with classifier 1, the pulverized coal is discharged from classifier 1, via coal pipes 2, to a furnace downstream. Coal pipes 2 are connected to the top of classifier 1 (as oriented in FIG. 1). Within classifier 1, there is discharge turret and discharge skirt 3. Discharge skirt 3 is equally divided into individual chambers by partition plates 4. There are three coal pipes 2 and three chambers in discharge skirt 3 defined by partition plates 4, however any suitable number of coal pipes, chambers, and partition plates can be used without departing from the spirit and scope of the invention. The number of chambers is equal to the number of coal pipes 2 from classifier 1. Each chamber is connected to a respective one of the individual coal pipes 2.

There is an extension skirt 5 connected to discharge skirt 3 concentrically. Extension skirt 5 is made with six circumferential segments 7. There are two segments 7 corresponding to each chamber of skirt 3. However, it is contemplated that there can be any suitable number of segments, such as one or more times of the number of chambers within the discharge skirt. Having multiple segments 7 for each chamber provides more flexibility and sensitivity for adjusting particle distribution than having a single segment per chamber. Each of the segments 7 of extension skirt 5 can move upward and downward individually along the discharge skirt wall, as oriented in FIG. 1, or in other words downstream and upstream, respectively. Segments 7 of extension skirt 5 can be positioned individually at different elevation levels to achieve optimum coal flow distribution between the partitioned chambers and between the coal pipes 2. Although all segments 7 of extension skirt 5 are configured to be identical, it is also contemplated that the configuration, number and size (width and height), and shape can be different and non-identical, based on application requirements, to control coal flow more effectively and flexibly into the chambers.

Figure 3:
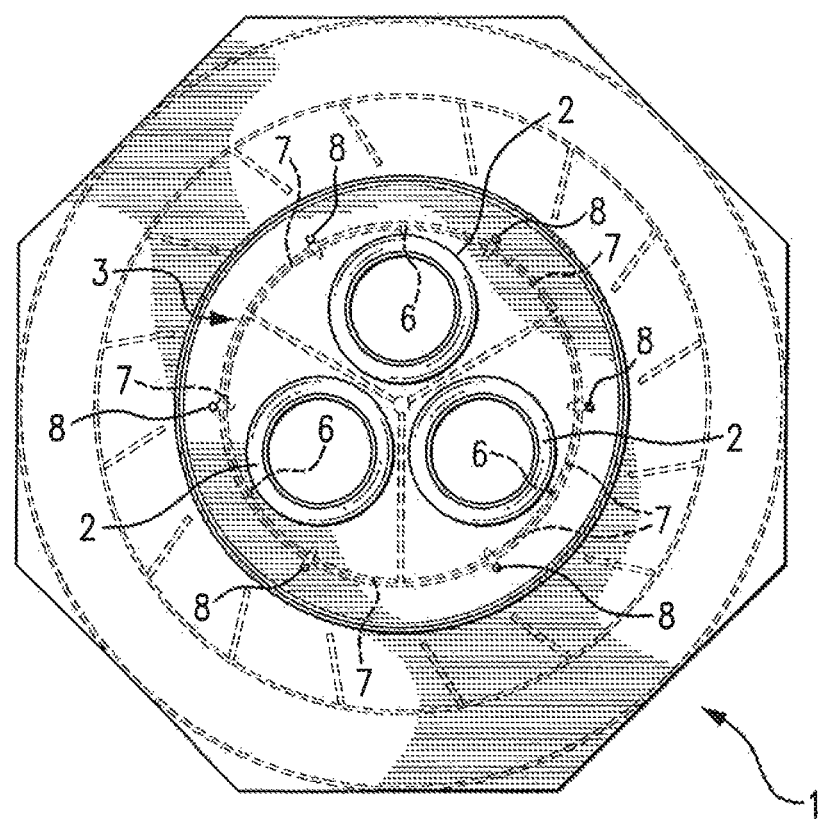
FIG. 3 is a plan view of the classifier of FIG. 1, showing the outlets of the classifier viewed from above as oriented in FIG. 1.

In order to move segments 7 of extension skirt 5 up and down smoothly and concentrically with discharge skirt 3, there are tracks 6 on the each side of each of the extension skirt segments 7. Tracks 6 are attached on the inner surface of discharge skirt 3. Tracks 6 are optional, but are advantageous because they help guide the skirt segments 7 vertically and restrain them in the radial and circumferential directions. The extension skirt segments 7 can be moved individually manually or by hydraulics, mechanical actuators, or any other suitable type of actuator or method. An indicator of level position, such as a displacement sensor or the like, can be used for controlling the position of each segment 7. FIGS. 1 and 3 show control rods 8, each of which is mounted to a separate segment 7. Rods 8 extend outside of classifier 1, and can be manipulated manually, or can be connected to an actuator as described above to move individual segments 7. The motion of some of the rods 8 and segments 7 is indicated by the double pointed arrows in FIG. 1.

Figure 2:
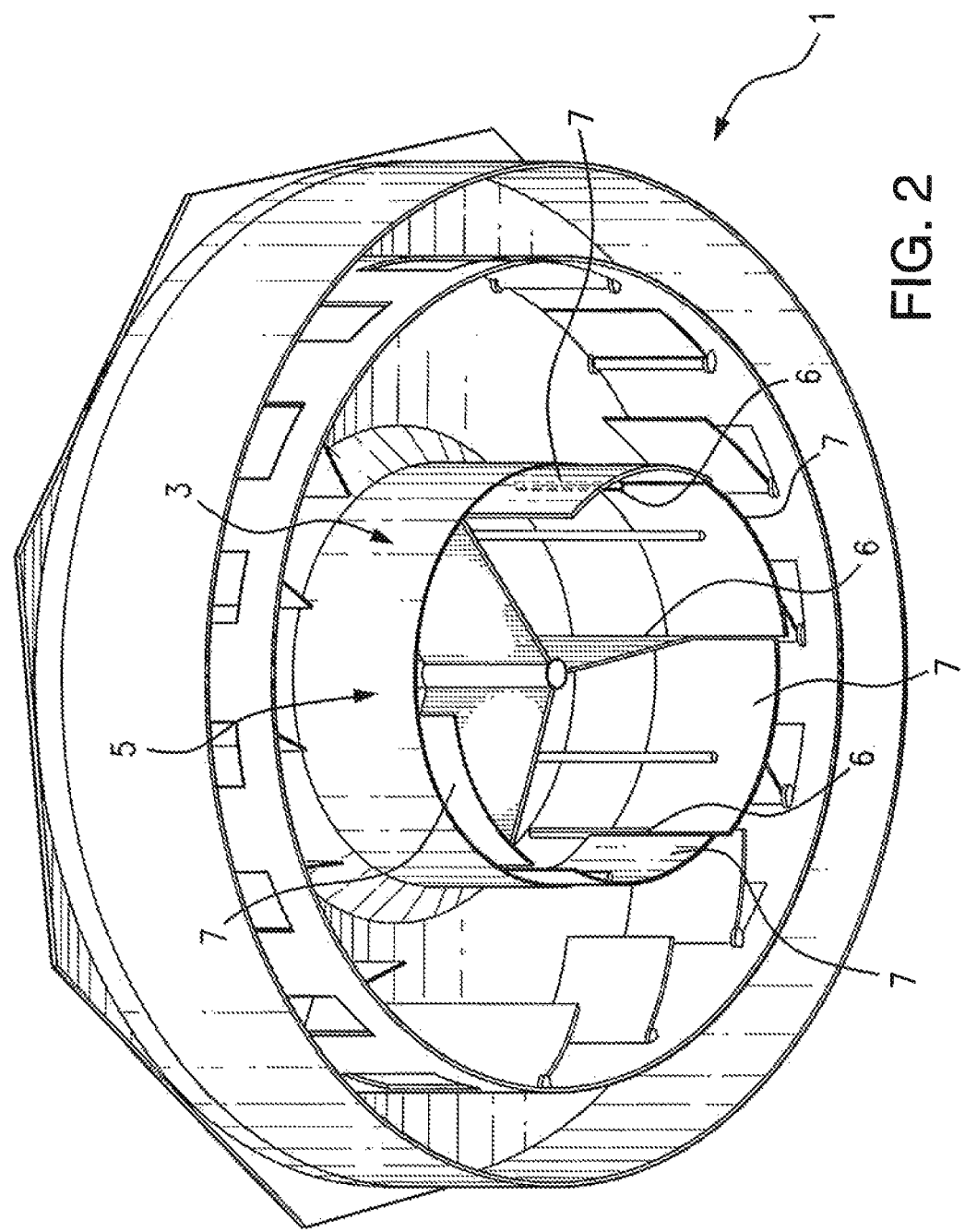
FIG. 2 is a perspective view of a portion of the classifier of FIG. 1, showing five of the six extension skirt segments extended in the upstream direction from the discharge skirt, with the remaining extension skirt segment withdrawn into the discharge skirt.

With reference now to FIG. 2, classifier 1 is shown with the inner and outer cones 9 and 10, shown in FIG. 1, removed to show extension skirt 5. For any given system, the positions of segments 7 can be adjusted individually to improve particle distribution among the downstream pipes. These positions of segments 7 can be determined by computer and/or physical modeling for a given application, and/or by using measurements. The position of each segment 7 needed to improve coal distribution can be predicted through use of computational modeling techniques on an application to application basis. Manual or on-line measurements of coal particle distribution, unburned carbon (UBC), heat rate and/or gaseous emissions ($NO_x$, CO, etc.) can also be used as a basis for adjusting the position of segments 7. FIG. 2 shows each of the six segments 7 positioned at a different elevation from the other segments 7, including one segment withdrawn into discharge skirt 3.

Adjusting one or more positions of segments of a solid particle flow distribution controller as described above to change solid particle flow distribution among a plurality of downstream pipes can improve coal particle distribution with little or no negative effect on PA flow. If the solid particle piping system is a coal piping system, as described in the exemplary embodiments above, the downstream pipes can be burner pipes operatively associated with a plurality of separate coal burners. Moving one or more of the segments to a proper position allows for optimization of air-to-coal ratios in individual burners, and/or shifting fuel distribution to control steam temperature and/or metal temperature of a boiler surface in a boiler. Segments can also be moved to shift fuel distribution, for example to decrease fuel flow to oxygen-starved regions of a furnace to reduce carbon monoxide emissions. Adjusting one or more positions of the segments can also be done to control overall burner air-to-coal ratio for the burners. The positions of the segments can be adjusted whether the coal classifier is off line or on line supplying coal to the burner pipes. Air flow distribution among the burner pipes can be controlled using external orifices in fluid communication with the burner pipes. Air or an other suitable gas can be used to convey coal particles through the solid particle flow distribution controller.

A traditional solid particle classifier can be retrofitted to include an extension skirt as described above. This includes installing a plurality of circumferential skirt segments as described above proximate a discharge skirt in a solid particle classifier. This can include replacing portions of the existing classifier such as a discharge turret, and with a discharge turret including an extension skirt as described above. This replacement discharge turret can be a pre-fabricated unit, for example, that is simply installed after removal of a traditional turret. It is also contemplated that components such as the skirt segments can be installed into the classifier through one or more openings such as doors, slots, pipe openings, or the like, without removing the existing turret.

While described above in the exemplary context of having two segments 7 per chamber, those skilled in the art will readily appreciate that the number of segments can be less than, greater than, or equal to the number of chambers as appropriate for given applications. It is also contemplated that the devices and methods described herein can be used in conjunction with additional flow distribution devices internal to or external of the classifier for fine tuning adjustments of the classifier to further enhance coal balance and/or distribution. The control of the segment positions can be accomplished using software, neural net, distributed control systems (DCS), or the like for automated combustion control optimization.

If used with a classifier as described above, the classifier can be external to a pulverizer, internal to a pulverizer, such as within a vertical spindle mill, or can be completely separate, i.e., not connected to a pulverizer at all. The classifier can optionally have a coal feed pipe extending through the centerline, such as if used in conjunction with any of the vertical roller, ball race, or bowl mill type vertical spindle pulverizer. The classifier can optionally have a center pipe for control of an inverted cone, e.g., adjustable return baffle 11 of FIG. 1, for use in preventing reverse air flow through the classifier or re-entrainment of coarse particles. Optionally, the classifier can have nothing in the center, such as in side feed type systems.

The components described herein can advantageously be fabricated of wear resistant material suitable for erosive and/or abrasive environments. The segments described above are shown mounted inside the discharge skirt 3, however, it is also contemplated that they can be installed outside discharge skirt 3, or the adjustable segments 7 could be used in place of discharge skirt 3, without departing from the spirit and scope of the invention.

The methods and systems described above have been shown and described in the exemplary context of coal piping systems. Those skilled in the art will readily appreciate that this is exemplary, and that the systems and methods of the invention can be applied in any suitable systems conveying particles through fluids, which benefit from uniform distribution between multiple discharge outlets such as in flow splitters. It is also contemplated that the partition plates described above are optional, and that optionally these can be shortened or removed without departing from the spirit and scope of the invention. Moreover, it is also contemplated that the invention can be practiced on new systems, such as new classifiers, as well as on existing systems as in retrofitting existing classifiers, without departing from the spirit and scope of the invention.

The methods and systems of the present invention, as described above and shown in the drawings, provide for classifiers with superior properties including improved particle and PA distribution between downstream pipes. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A method of retrofitting a solid particle classifier comprising installing a plurality of circumferential skirt segments proximate a discharge skirt in a solid particle classifier, wherein the skirt segments are configured and adapted for motion in an upstream and downstream direction independent of one another relative to the discharge skirt to extend upstream as needed to improve solid particle distribution between outlets of the discharge skirt.

2. A method of retrofitting as recited in claim 1, wherein installing a plurality of circumferential skirt segments includes replacing a portion of the classifier.

3. A method of retrofitting as recited in claim 2, wherein replacing a portion of the classifier includes replacing a discharge turret of the classifier.

4. A method of retrofitting as recited in claim 1, wherein installing a plurality of circumferential skirt segments includes installing components in the classifier through one or more openings selected from the group consisting of a door, a slot, and a pipe opening.

5. A method of controlling solid particle flow in each pipe of a solid particle piping system, the method comprising:
adjusting one or more positions of the segments of a solid particle flow distribution controller to change solid particle flow and mass flow distribution among a plurality of downstream pipes, wherein the solid particle flow distribution controller includes an extension skirt configured to be mounted to a discharge skirt at a division between an upstream solid particle conveyance pipe and a plurality of downstream pipes, the extension skirt including a plurality of circumferential segments, each segment movably mounted to the discharge skirt for movement in an upstream and downstream direction with respect to the discharge skirt, wherein the segments of the extension skirt are configured and adapted for motion in the upstream and downstream direction independent of one another to extend upstream of the discharge skirt as needed to improve solid particle distribution among the downstream pipes.

6. A method of controlling solid particle flow as recited in claim 5, wherein the solid particle piping system is a coal piping system, wherein the downstream pipes are burner pipes operatively associated with a plurality of coal burners.

7. A method of controlling solid particle flow as recited in claim 6, further comprising moving one or more of the segments to a position to optimize air-to-coal ratios in individual burners.

8. A method of controlling solid particle flow as recited in claim 6, further comprising moving one or more of the segments to a position shifting fuel distribution to control temperatures in a boiler.

9. A method of controlling solid particle flow as recited in claim 6, further comprising moving the segments to a position shifting fuel distribution to decrease fuel flow to oxygen-starved regions of a furnace to reduce carbon monoxide emissions.

10. A method of controlling solid particle flow as recited in claim 6, further comprising adjusting one or more positions of the segments with a coal classifier on line supplying coal to the burner pipes.

11. A method of controlling solid particle flow as recited in claim 6, further comprising controlling air flow distribution among the burner pipes using external orifices in fluid communication with the burner pipes.

12. A method of controlling solid particle flow as recited in claim 6, wherein adjusting one or more positions of the segments includes controlling at least one of overall burner air-to-coal ratio for the burners, flyash unburned carbon, and loss on ignition.

13. A method of controlling solid particle flow as recited in claim 5, further comprising conveying coal particles through the solid particle flow distribution controller using a gas other than air.

\* \* \* \* \*